United States Patent Office 3,257,032
Patented June 21, 1966

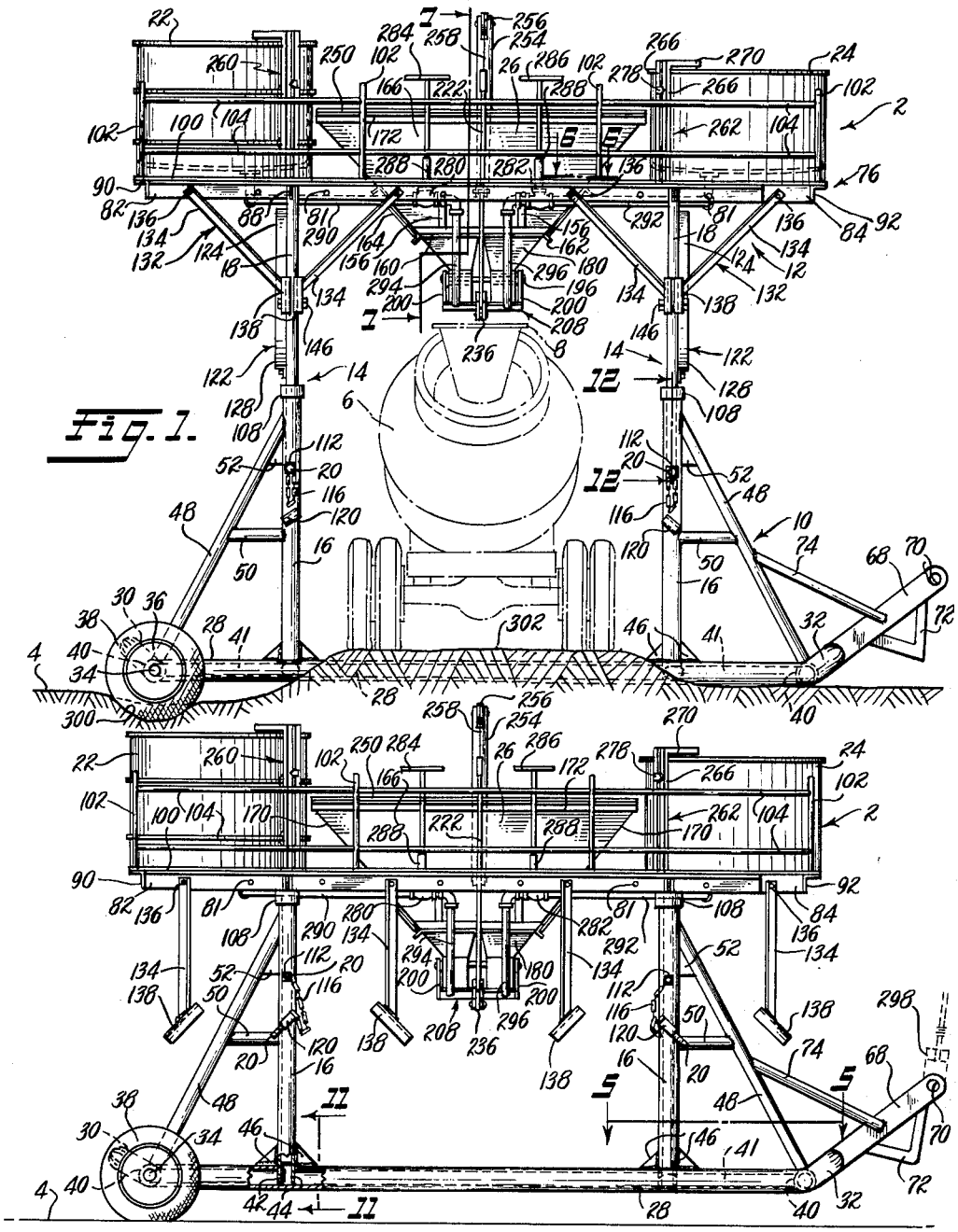

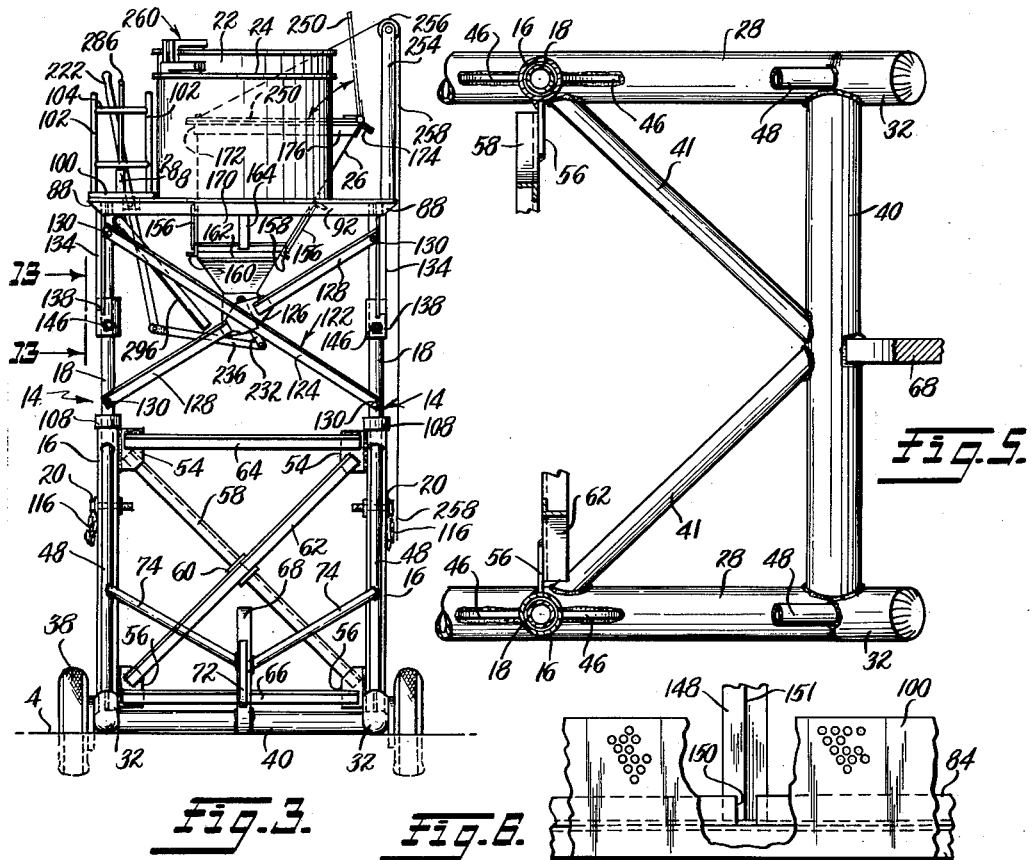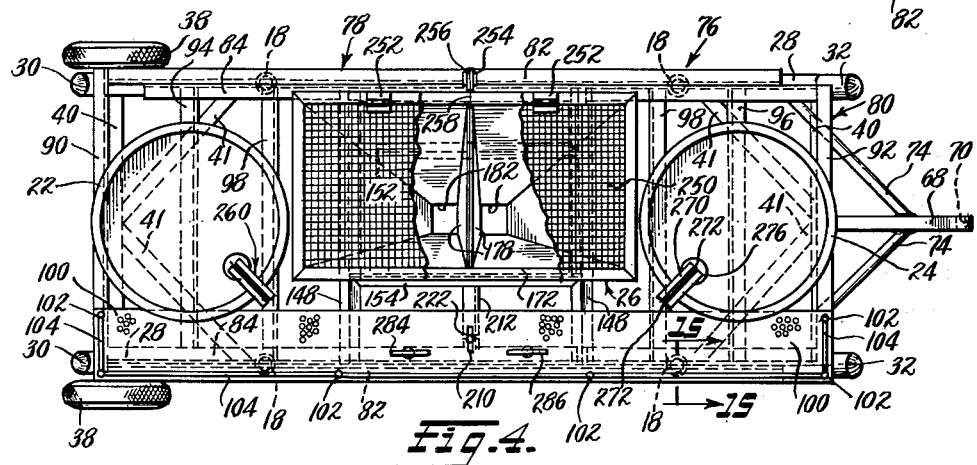

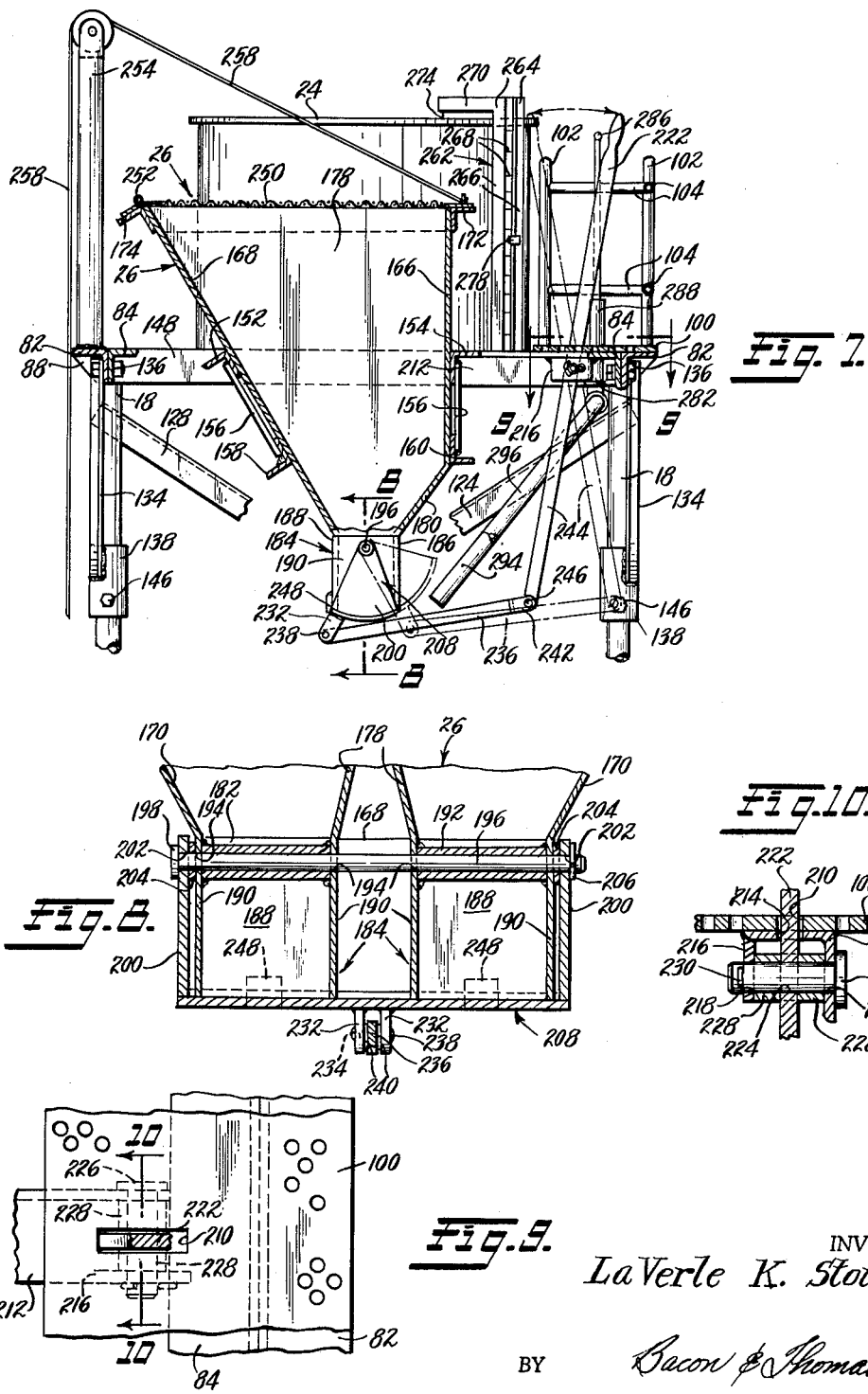

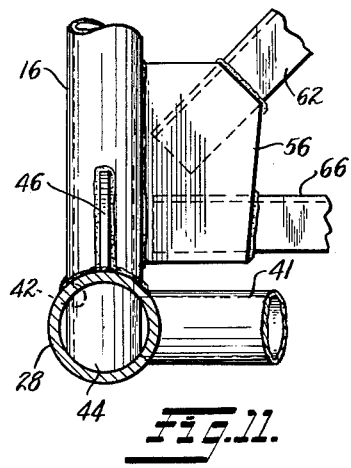
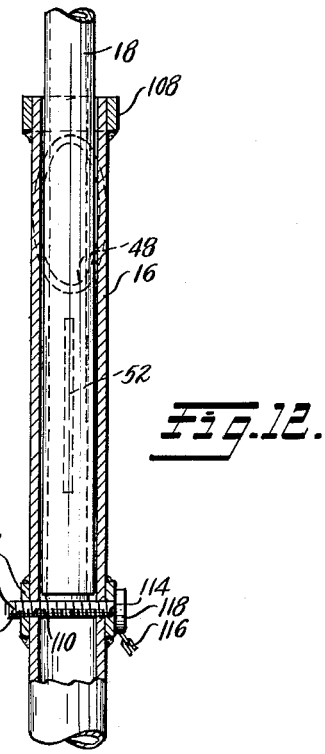
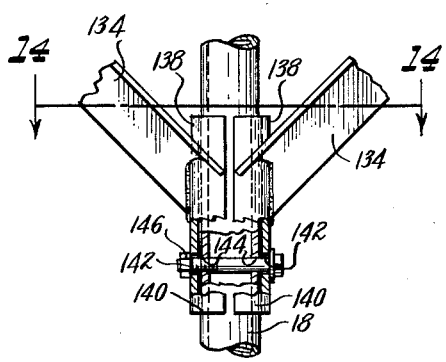
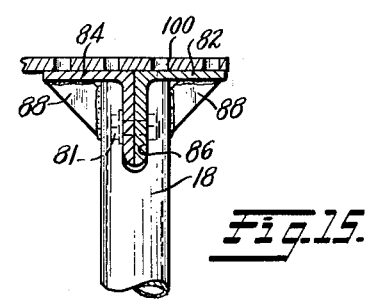
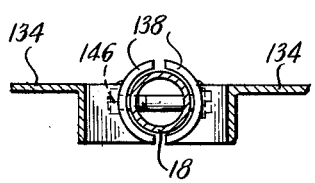
INVENTOR
LaVerle K. Stout

3,257,032
PORTABLE SLURRY BATCHING PLANT
La Verle K. Stout, 3431 Olsen Drive, Corpus Christi, Tex.
Filed Oct. 23, 1963, Ser. No. 318,306
17 Claims. (Cl. 222—26)

This invention relates generally to portable batching plants, and more particularly to a portable batching plant designed for on-site use to accurately combine the constituents of a slurry mixture.

Slurry is a recently developed resurfacing material for use on paved roads which, while structurally sound, have surface cracks and other pavement irregularities. The slurry mix is applied to a clean paved road surface, and when cured forms a thin coating which seals cracks and breaks to prevent water from seeping through the pavement onto the roadbed. Further, the cured slurry mix provides a smooth road surface similar in appearance to surfaces previously attainable only from more expensive resurfacing materials and processes, and which will withstand considerable wear.

The usual slurry mixture comprises emulsified asphalt, aggregate and water, and is applied as a very thick liquid to a road surface with the use of a squeegee apparatus. The aggregate utilized in the slurry can be sand, rock dust, crushed particles of rock or gravel, crushed limestone, or any combination of these and like materials. A typical graduation of aggregate for a slurry mixture comprises those particles which uniformly pass through standard sieve sizes 8 (from 95 to 100%) to 200 (from 8 to 12%). The larger aggregate particles in the slurry provide a roughened, non-skid road surface even when wet, and the finer particles blend with the asphalt molecules to provide a smooth, easily spread, stable slurry mixture.

While the proportions of emulsified asphalt, aggregate and water can be varied, depending upon the properties desired, a typical slurry mixture will contain 2000 pounds of dry aggregate, 400 pounds of emulsified asphalt and 25 gallons of water. In the invention, the slurry mixture is carried to the road resurfacing site in mobile mixing trucks of the kind normally used for concrete, the constituents of the mixture being placed in the tank of the truck for mixing in transit to the construction site. The asphalt emulsion and water are normally added to the tank first, after which the aggregate is loaded while the mixing tank is in operation, a loading sequence which avoids balling of the mixture. A typical mixing time for a load of slurry is about six minutes, and a typical mobile mixing truck can contain enough slurry to resurface 1100 square yards of road surface to a depth of ⅛ on an inch.

Curing of the slurry is a dehydration process, and occurs in from ½ hour up to three or four hours after the emulsified asphalt aggregate and water have been mixed depending upon the atmospheric temperature. Thus, the time between combining the constituents and applying the slurry is critical, and should not exceed ½ hour. Prior to applying the slurry to a road surface, the surface is normally swept clean, and can be wet down to prevent premature dehydration of the slurry and to facilitate tacking of the slurry to the existing pavement.

If resurfacing with slurry is to be successful, the proportions of emulsified asphalt, aggregate and water must be precisely controlled for each batch, and the time between combining these materials and applying the resultant slurry mixture to the road should be maintained as short as possible, not to exceed about ½ hour. If proportions are inaccurately maintained, the resultant slurry will not have uniform characteristics and can result in a poor road surface which will break up within a short period of time. If the time between combining the constituents and applying the slurry to a road surface exceeds about ½ hour, curing will have already begun and the batch will be useless.

The portable batching plant of the present invention is constructed for on-site use in conjunction with a mobile mixing truck at a road resurfacing project, and thus insures that the time between mixing and applying a slurry mixture can be kept to a minimum. Further, the present batching plant is constructed to precisely measure the quantities of emulsified asphalt, water and aggregate supplied to the mixing truck, and thus good quality control is obtainable for the slurry. The present invention thus contributes significantly to the successful use of slurry for road resurfacing.

The subject batching plant includes a base and a platform, the platform being supported on the base by a plurality of telescopic supports. The platform is movable between a lowered and an elevated position, and the telescopic supports include means to secure the platform in a position elevated above the base. Unique bracing structure is provided to brace the elevated platform in both longitudinal and transverse directions, and which structure is compatible with the operation of the telescopic supports.

The platform can be lowered for moving the batching plant from one site to another, and the base is provided with wheels on the rear end thereof to facilitate transporting thereof. The batching plant can be transported by merely hitching a tongue, provided on the forward end thereof, to a tow truck or other vehicle, and is thus readily portable.

The platform is designed for safe occupancy by an operator, and has storage tanks mounted thereon for containing emulsified asphalt and water, both of the tanks being provided with sight gauges which measure the quantities of liquid contained therein. A bin or hopper is cradled in a saddle carried by the platform between the storage tanks and is constructed to hold a measured quantity of aggregate. The hopper terminates at its lower end below the platform in a gravity-fed chute assembly, and conduits lead from the two storage tanks and exhaust beneath the platform adjacent said chute.

The chute assembly is provided with a gate operable by a lever on the platform, and a valve is connected in each conduit and is also operable from the platform. By merely operating controls on the platform, an operator can thus deliever precise quantities of emulsified asphalt, water and aggregate into a mixing truck parked with its filling spout disposed under the chute assembly and the outlet ends of said conduits.

It is an object of the present invention to provide a batching plant constructed for precisely measuring the constitutents of a slurry mixture, and for delivering the measured constitutents to a suitable mixing apparatus.

Another object is to provide a slurry batching plant constructed to be readily and safely portable.

A further object is to provide a batching plant incorporating a platform having a walkway for an operator, and including manually operable apparatus for dispensing precisely measured quantities of materials.

It is also an object to provide a portable batching plant which is partially collapsible for transport, and including bracing structure that is compatible with the collapsible structural members of said plant.

Other objects and many of the attendant advantages of this invention will be readily appreciated from the following detailed description and the accompanying drawings, wherein:

FIG. 1 is a side elevational view of the batching plant of the invention erected for operation, with a mobile mixing truck being shown in phantom lines positioned for receiving material from the batching plant;

FIG. 2 is a side elevational view, partially in section, of the batching plant of the invention as it appears when ready for transport, the platform being shown in its lowered position;

FIG. 3 is an end elevational view of the batching plant of FIG. 1, as viewed from the right-hand, or front, end thereof;

FIG. 4 is a plan view, partially broken away, of the batching plant of FIG. 1;

FIG. 5 is an enlarged, fragmentary, horizontal sectional view taken along the line 5—5 of FIG. 2, showing the forward end of the base of the batching plant;

FIG. 6 is a greatly enlarged, partially broken away, fragmentary, plan view taken along the line 6—6 of FIG. 1, showing the manner in which one of the upper transverse members of the hopper-supporting saddle is secured to the inner platform frame;

FIG. 7 is an enlarged, fragmentary, vertical sectional view taken along the line 7—7 of FIG. 1, showing in particular the construction of the hopper, chute and gate apparatus;

FIG. 8 is a fragmentary, enlarged, vertical sectional view taken along the line 8—8 of FIG. 7, showing the construction of the hopper chutes and gate apparatus;

FIG. 9 is an enlarged, fragmentary, horizontal view taken along the line 9—9 of FIG. 7, showing the construction of the gate operating lever supporting structure;

FIG. 10 is a fragmentary, vertical sectional view taken along the line 10—10 of FIG. 9;

FIG. 11 is an enlarged, fragmentary, vertical sectional view taken along the line 11—11 of FIG. 2, showing the manner in which the cylindrical standards are connected to the longitudinal members of the base;

FIG. 12 is an enlarged, fragmentary, vertical sectional view taken along the line 12—12 of FIG. 1, showing the manner in which the lower ends of the support posts of the platform are telescopically received within the upper ends of the vertical standards, and the pin arrangement for securing the platform in an elevated position;

FIG. 13 is an enlarged, fragmentary, partially broken away elevational view, taken along the line 13—13 of FIG. 3, showing the construction of the lower ends of the longitudinal platform braces;

FIG. 14 is a horizontal, sectional view taken along the line 14—14 of FIG. 13; and FIG. 15 is an enlarged, fragmentary, vertical sectional view taken along the line 15—15 of FIG. 4, showing the manner in which the framework of the platform is mounted on the upper ends of the supporting posts.

Referring now to the drawings, the batching plant of the invention is indicated generally at 2, and is shown in FIG. 1 in its operative position resting on the earth 4. A mobile mixing truck is indicated by phantom lines at 6 in FIG. 1, the filling spout 8 of said truck being positioned under the material outlets of the batching plant 2 for receiving the constituents of a batch of slurry mixture.

The plant 2 includes a base 10 and a platform 12, the platform 12 being supported above the base 10 by a plurality of telescopic supports 14. The telescopic supports 14 comprise a plurality of vertical tubular standards 16 mounted on the base 10, which telescopically receive a like plurality of downwardly projecting posts 18 attached to the platform 12. The platform 12 is movable between lowered and elevated positions relative to the base 10, and is secured in an elevated position by pins 20, in a manner to be further described hereinafter.

Disposed on and secured to the platform 12 are a water storage tank 22 and an emulsified asphalt storage tank 24. The tanks 22 and 24 are positioned at opposite ends of the platform 12, and a bin or hopper 26 is cradled therebetween for dispenesing measured quantities of dry aggregate.

The base 10 comprises a pair of spaced, longitudinally extending tubular members 28, which terminate at their rear and forward ends in upwardly inclined, welded-in-place, capped extensions 30 and 32, respectively. An outwardly projecting axle 34 is welded at the juncture of each of the rear extensions 30 with the aft end of its associated tubular member 28, and functions to support wheels 36 having pneumatic tires 38 mounted thereon. Transverse tubular members 40 (best seen in FIGS. 4 and 5) extend between and are welded to the opposite ends of the tubular members 28, and provide rigidity to the base 10. Horizontally disposed tubular corner braces 41 are welded at one end thereof centrally of members 40, and extend at an angle to the longitudinal members 28, to which they are also welded.

The standards 16 are secured to the longitudinal tubular members 28 to project upwardly therefrom, four such standards being employed and being arranged in longitudinally spaced, transversely opposed pairs. As is best seen in FIGS. 2 and 11, the longitudinal tubular members 28 are provided, inwardly of the corner braces 41, with bores 42 in the top surfaces thereof of a size to telescopically receive the lower ends 44 of the tubular standards 16. The lower ends of the standards 16 are inserted through said bores 42, and are welded to their associated tubular members 28. Longitudinally extending gusset plates 46 are welded on opposite sides of each of the cylindrical standards 16 and to the top surface of their associated tubular member 28, and function to partially brace their associated standards 16.

The tubular standards 16 are further braced against movement longitudinally of the base 10 by inclined tubular braces 48, which extend from the opposite ends of the tubular members 28 to just below the upper ends of the standards 16, and which are welded in position. Horizontal tubular cross members 50 extend longitudinally between the midportions of the tubular braces 48 and the standards 16 and are welded thereto, and triangular gusset plates 52 are welded between the upper ends of the tubular braces 48 and their associated standards 16.

The tubular standards 16 are also braced in a transverse direction, which bracing structure is best seen in FIGS. 3, 5 and 11. Referring to said figures, upper and lower plates 54 and 56 are welded on the confronting surfaces of each pair of transversely opposed standards 16, and an angle iron 58 extends diagonally between and is welded to the upper plate 56 on one standard 16 and a lower plate 54 on its transversely opposed standard. The angle irons 58 have rectangular plates 60 welded centrally thereof, said plates 60 having a thickness equal to the thickness of the plates 54 and 56. Angle iron braces 62 are welded to the rectangular plates 60 on the sides thereof opposite to that on which the angle irons 58 are welded, and extend in diagonal directions opposite to that of said angle irons 58. The opposite ends of the angle iron braces 62 are welded to the other upper and lower plates 54 and 56 of each transversely opposed set, the angle irons 58 and 62 being disposed to lie on opposite sides of a plane including their associated four plates 56 and 54. The base 10 is further braced in the transverse direction by upper and lower angle irons 64 and 66, which are welded to extend between each pair of opposed upper and lower plates 54 and 56, respectively.

The front transverse tubular member 40 has an upwardly inclined tongue 68 welded centrally thereof, said inclined tongue 68 comprising a bar having a bore 70 near the upper, outer end thereof. A triangular guard 72 (FIGS. 1–3) is welded to the undersurface of the tongue 68, and the lower ends of a pair of inclined tubular braces 74 are welded medially of the tongue 68 and extend to the front inclined tubular braces 48. The tongue 68 is utilized for connecting the batching plant 2 to a suitable towing vehicle.

The platform 12 includes a rectangular frame 76, best seen in FIG. 4. The frame 76 comprises outer and inner generally U-shaped subframes 78 and 80, the sides of said subframes 78 and 80 comprising angle irons 82 and 84, respectively, arranged with their vertical legs positioned in back-to-back engagement. As is best shown in FIG. 15, the vertical legs of adjacent angle irons 82 and 84 are secured together by spaced bolts 81, and are received within notches 86 in the upper ends of the posts 18. Transversely extending gusset plates 88 are welded between diametrically opposed sides of the posts 18 and the underside of the horizontal flanges of the angle irons 82 and 84. The subframes 78 and 80 can be telescopically adjusted during manufacture to provide a platform 12 of the desired length, and are thereafter held fixed in position by the bolts 81 and the gusset plates 88.

The rear ends of the angle irons 82 of the outer subframe 78 are bridged by an angle iron 90, which is welded thereto. Similarly, the front ends of the angle irons 84 of the inner subframe 80 are connected by an angle iron 92. The inner subframe 80 is further braced by rear and front transversely extending angle iron braces 94 and 96, which are welded in position and lie below the confronting horizontal flanges of the angle irons 84. In addition, the inner subframe 80 is also braced by a pair of transversely extending angle iron braces 98, which are positioned between and adjacent to the posts 18.

A perforated plate 100 is welded to the top surfaces of the angle irons 82, 84, 90 and 92 on the front side of the platform 12, and comprises a walkway for a workman operating the batching plant 2. A plurality of spaced, vertical posts 102 are welded along the outer periphery of plate 100, and rails 104 are welded between said posts 102 to provide a safety railing for the walkway defined by said plate 100.

The downwardly projecting posts 18 of the platform 12 are telescopically received in the tubular standards 16, and together therewith define the telescopic supports 14 for supporting the platform 12 above the base 10. As is best shown in FIG. 12, the upper ends of the tubular standards 16 have protective collars 108 welded thereabout, and are provided with diametrically extending bores 110 spaced from the upper ends thereof a distance equal to about ¼ the length of said standards. Reinforcing plates 112 are welded on the diametrically opposite sides of the standards 16 in the region of the bores 110, and have bores 114 extending therethrough positioned to confront the bores 110.

In use, the platform 12 is lifted by a suitable hoisting device, such as a crane, from its lowered, traveling position as shown in FIG. 2 to the elevated operational position shown in FIG. 1. While the platform 12 is supported by said hoisting device, the pins 20 are inserted through the bores 114 and 110 beneath the lower ends of the posts 18. After the pins 20 are in position, the device utilized for lifting the platform 12 can be disconnected therefrom, and said platform will remain in its elevated, operational position.

The pins 20 can be retained in the bores 110 and 114 by any suitable means. In the embodiment shown in the drawings the pins 20 are threaded, and at least one of the bores 110 and 114 are also threaded to secure the pins 20 therein. One end of a lightweight chain 116 is welded to a head 118 provided on each pin 20, and the other end of each said chain is welded to the surface of its associated standard 16 adjacent to the plates 112. The chains 116 insure that the pins 20 will not be misplaced. Referring to FIG. 2, cylindrical collars 120 are welded to the outer surfaces of the standards 16, and extend at an angle of about 45 degrees to the horizontal. The collars 120 are intended to receive the pins 20 when the platform 12 is in its lowered position to prevent loss thereof during transport of the batching plant.

The platform 12 is provided with longitudinal and transverse bracing associated with the posts 18 to stabilize it when it is in an elevated position above the base 10. Referring in particular to FIGS. 1 and 3, transverse bracing is provided by brace assemblies 122, one assembly for each transversely opposed pair of posts 18. Each brace assembly 122 includes a diagonally extending angle iron 124, to which is welded, medially thereof, a plate 126. Secured to each exposed side of the plate 126 is a pair of aligned angle irons 128, which extend diagonally in a direction opposite to the angle iron 124; the angle irons 124 and 128 are positioned with the vertical legs thereof secured to the same face of the plate 126, as is best shown in FIG. 3. The free ends of the angle irons 124 and 128 of each brace assembly 122 are provided with bores, and said brace assemblies are secured to the posts 18 by bolts 130 which pass therethrough and through bores in the posts 18.

The transverse brace assemblies 122 must be removed before the platform 12 can be moved to its lowered position because their presence prevents telescoping of the posts 18 within the tubular standards 16. When the platform 12 has been raised to an elevated position above the base 10 the brace assemblies 122 are installed, and thereafter function to brace the platform 12 in a transverse direction.

The platform 12 and posts 18 are braced in a longitudinal direction by detachable brace assemblies 132, best seen in FIGS. 1, 2, 13 and 14. One brace assembly 132 is associated with each of the posts 18, and each assembly includes a pair of angle irons 134 which are pivotally attached at their upper ends by bolts 136 to the frame 76. As is best shown in FIG. 13, the lower ends of the angle irons 134 have semicylindrical collars 138 welded thereto, said collars 138 being angularly positioned relative to the angle irons 134 so that the semicylindrical inner surfaces thereof will engage opposite sides of the cylindrical outer surfaces of the posts 18 when the angle irons 134 extend downwardly toward said posts 18 at about a 45 degree angle.

The semicylindrical collars 138 of each pair of angle irons 134 are positioned to engage the opposite sides of a post 18, as is best shown in FIG. 13, and include portions 140 which extend downwardly below their respective angle irons 134. The downwardly extending portions 140 of the collars 138 have confronting bores 142 therein, which are aligned with a transverse bore 144 through the post 18 when the collars 138 are embraced thereabout. A bolt 146 is passed through the bores 142 and 144, and functions to secure the semicylindrical collars 138 of each brace assembly 132 to their respective posts.

The longitudinal braces 132 are shown in assembled relationship in FIG. 1, wherein it is seen that the angle irons 134 function to longitudinally brace the platform 12. When it is desired to lower the platform 12, the bolts 146 are removed and the angle irons 134 are swung free of the posts 18 to the vertical hanging positions shown in FIG. 2. After the brace assemblies 132 have been disconnected from the post 18, and after the brace assemblies 122 have been removed, the platform 12 can be lowered to telescope the posts 18 within the standards 16. It is apparent that longitudinal and transverse brace assemblies have been provided for the platform 12 which are fully compatible with the telescopic supports 14 and which can be easily installed and removed.

The bin, or hopper, 26 is cradled in a saddle provided on the platform 12 and hence can be easily installed and removed, should repair or replacement thereof be desirable. Referring to FIGS. 1, 4, 6 and 7, the saddle for holding the bin 26 includes a pair of transversely extending angle irons 148, which are disposed with both flanges thereof pointing downwardly and outwardly, whereby the confronting faces of the spaced angle irons 148 define angularly related surfaces for receiving the inclined walls of the hopper 26. The spaced angle irons 148 are welded to the vertical legs of the confronting angle irons 84 of the inner subframe 80, and as is best shown in FIG. 6 a notch 150 is cut out of the horizontal flange of said angle irons 84 to permit the top edge 151 of the angle irons 148 to lie even with the top surface of the angle irons 84 and 82.

As is best seen in FIG. 7, a pair of spaced, longitudinally extending rear and front angle irons 152 and 154 are welded to extend between the angle irons 148. The front angle iron 154 is posititioned with one leg thereof disposed vertically, and with the other leg thereof disposed to extend horiontally toward the confronting angle iron 84. The rear angle iron 154 is disposed at an angle corresponding to the inclined rear surface of the hopper 26. A pair of bars 156 are welded to each of the angle irons 152 and 154, and extend downwardly therefrom. A pair of rear and front lower angle irons 158 and 160, respectively, are welded on the lower ends of the bars 156, and a pair of lower, transversely extending angle irons 162 (FIGS. 1 and 3) connect the opposite ends of said angle irons 158 and 160. Bars 164 are welded to extend between the transverse angle irons 148 and the transverse angle irons 162, and function to add rigidity to the saddle.

The hopper 26 is received within the saddle defined by the angle irons 148, 152, 154, 158, 160 and 162, and comprises a vertical front plate 166, an inclined back plate 168, and a pair of inwardly inclined side plates 170, which plates are all welded together along their mating edges. The top edges of the plates 166, 168 and 170 have angle iron braces 172, 174 and 176, respectively, welded about the exterior thereof.

The hopper 26 is provided with a pair of transversely extending, centrally positioned, divider plates 178, which are welded together at their top edges, and which diverge slightly as they extend toward the bottom of the hopper (best shown in FIGS. 4 and 8). The hopper 26 also includes an inwardly inclined, lower front plate 180, and the lower front corners of the side plates 170 and the divider plates 178 are cut back to accommodate said lower front plate 180. The hopper 26 is thus divided into two compartments, and each compartment terminates at its lower end in a rectangular opening 182.

Secured to the lower end of the bin 26 under each of the openings 182 is a rectangular chute 184. Each of the chutes 184 includes a front plate 186, a rear plate 188, and a pair of side plates 190, the lower edges of the side plates being arcuate and at their center extending slightly below the lower edges of the rear and front plates 188 and 186, respectively, as is best shown in FIG. 7. Each of the chutes 184 has a centrally positioned, longitudinally extending bushing 192 welded therein near the open top end thereof, the bushings 192 in the two chutes 184 being aligned; the lower arcuate edges of the side plates 190 are formed on a radius emanating from the longitudinal central axes of the aligned bushings 192.

The side plates 190 of the chute 184 are provided with bores 194 in alignment with the cylindrical bushings 192, and a shaft 196 having a head 198 thereon extends through said bores 194 and through the bushings 192. The upper ends of a pair of bracket arms are provided with bores 202, and said arms are suspended thereby from the shaft 196. Bushings 204 are disposed between the bracket arms 200 and the side plates 190, and the shaft 196 is held in position by a pin 206 which passes through a bore in the end thereof opposite the head 198.

The arms 200 function to support a gate 208, which gate comprises a plate shaped to conform to a section of a cylinder having a radius corresponding to that of the lower arcuate edges of the side plates 190. The lower edges of the bracket arms 200 are shaped to conform to the arcuate surface of the gate 208, and are welded thereto. It is thus seen that the gate 208 can be pivoted about the shaft 196, and that the arcuate inner surface thereof may remain engaged with the lower arcuate edges of the side plates 190 throughout such movement.

The gate 208 is controlled by an operator positioned on the platform 100, an actuating lever assembly being connected thereto for this purpose, best seen in FIGS. 4, 7, 9 and 10. The walkway plate 100 is provided with a transversely extending rectangular opening 210 centrally thereof, and an angle iron 212 is welded to the undersurface of said plate 100 below said opening 210 and extends from the angle iron 84 to the front angle iron 154 of the saddle supporting the hopper 26. As is best shown in FIG. 10, the angle iron 212 is positioned with the horizontal flange thereof in engagement with the lower surface of the plate 100, said horizontally disposed flange having a rectangular opening 214 therein identical with and positioned immediately below the rectangular opening 210.

A bar 216 is welded to extend downwardly from the free edge of the horizontal flange of the angle iron 212 in the region of the rectangular opening 214, and said bar 216 and the vertical flange of the angle iron 212 have aligned bores 218 and 220, respectively, therein. An actuating lever 222 extends downwardly through the rectangular openings 210 and 214, and has a medially positioned bore 224 extending therethrough. A headed pin 226 passes through the bores 218, 220 and 224, and pivotally mounts the lever 222 for movement toward and away from the bin 26. Bushings 228 are positioned on opposite sides of the lever 222 on the pin 226, and the pin 226 is secured in position by a pin 230 extending through a transverse bore near one end thereof.

The gate 208 has a pair of spaced lugs 232 secured centrally to the undersurface thereof, said lugs having aligned bores 234 extending therethrough. One end of a link 236 is pivotally connected between the lugs 232 by a pin 238, a pair of bushing washers 240 being disposed on opposite sides of the link 236 on the pin 238. The other end 242 of the link 236 is bifurcated, and the lower end 244 of the lever 222 is pivotally connected thereto by a pin 246. The link 236 and the lever 222 are proportioned so that the gate 208 will be in its fully closed position when the lever 222 is pivoted fully forward toward the rails 104, and so that said gate will be fully opened when the lever 222 is moved fully toward the hopper 26. A stop 248 is welded to the rear plate 188 of each chute 184, and functions to insure positive placement of the gate 208 in its closed position.

The hopper 26 is fitted with a wide mesh screen 250 that functions to prevent oversize material and large foreign matter from entering said hopper as it is being filled. Referring to FIGS. 3, 4 and 7, the screen 250 is secured along its rear edge by hinges 252 to the angle iron brace 174, and normally rests on the braces 172, 174 and 176. A post 254 is secured to the rear angle iron 82 to project upwardly therefrom, and is positioned centrally of the hopper 26. The post 254 is provided with a pulley 256 at the upper end thereof, and a rope 258 is passed over said pulley and is secured medially to the front edge of the screen 250. The post 254 extends a substantial distance above the top of the hopper 26 and, as is shown by phantom lines in FIG. 3, the screen 250 can be swung to an open position by merely pulling on the rope 258, whereby to give ready access for leveling and measuring material contained within the hopper 26.

The water tank 22 and the emulsified asphalt tank 24 are both open at their upper end for easy filling, and are both provided with sight gauges 260 and 262 for readily determining the amount of liquid contained therein, and for measuring the amount of liquid dispensed. The gauges 260 and 262 are identical in construction, and hence a description of the gauge 262 will suffice for both.

Referring to FIGS. 4 and 7, the gauge 262 comprises a pair of spaced, L-shaped members 264. The vertical legs 266 of the L-shaped members 264 are secured to the exterior of the tank 24 in a position to be easily viewed from a position adjacent the lever 222, and have indicia 268 thereon arranged to indicate the quantity of liquid contained within the tank. The horizontal arms 270 of the members 264 extend radially over the interior of the tank 24, and have a pair of pulleys 272 (FIG. 4) mounted therebetween at the opposite ends thereof.

A flexible cord 274 is passed over the pulleys 272, and one end thereof is secured to a weight 276 disposed within the tank 24. The other end of the cord 274 is secured to a weighted pointer 278, which is received between the vertical legs 266 on the exterior of the tank 24. The weight 276 and the weighted pointer 278 are so proportioned that the weight 276 will float on liquid contained within the tank 24, and will move up and down with the level thereof. The cord 274 is proportioned so that the pointer 278 will cooperate with the indicia 268 to accurately indicate the quantity of fluid contained within the tank 24, and the quantity dispensed therefrom.

Referring to FIGS. 1, 2 and 7, a pair of flow control valves 280 and 282 are secured beneath the plate 100 on opposite sides of the lever 222, said valves being operable by T-shaped handles 284 and 286, respectively, which project upwardly through the plate 100 on opposite sides of the lever 222; tubular bushings 288 are welded to the plate 100, and the handles 284 and 286 extend through said bushings and are partially supported thereby. The valves 280 and 282 are arranged to be operated by merely twisting their respective T-shaped handles 284 and 286.

A conduit 290 extends from the bottom of the tank 22 to the inlet of the valve 280, and a similar conduit 292 connects the bottom of the tank 24 to the valve 282. A pair of angled outlet pipes 294 and 296 are connected to the outlet ports of the valves 280 and 282, respectively, and extend downwardly toward the region of the gate 208. As is best shown in FIG. 1, the outlet ends of the pipes 294 and 296 and the gate 208 are positioned so that both of said pipes and the hopper 26 can exhaust simultaneously into the filling spout 8 of the mixing truck 6.

The batching plant 2 of the invention is primarily intended for accurately combining the constitutents of slurry mixtures for use on road resurfacing projects. The plant 2 may be towed to the vicinity of a road resurfacing project by a suitable vehicle, a clevis 298 (shown in phantom lines in FIG. 2) being connected to the tongue 68 and being attached to a towing vehicle for this purpose. For several reasons, the platform 12 is preferably collapsed to the lowered position shown in FIG. 2 when being transported.

When the plant 2 is in the erected position shown in FIG. 1, the height thereof will typically exceed 20 feet. Accordingly, if the batching plant 2 were to be moved while erected, difficulty would be encountered with bridges, foliage, transmission lines, and like overhead obstacles. By lowering the platform 12 to the position shown in FIG. 2 before transporting the batching plant, these problems can be avoided. Further, the batching plant 2 has a much lower center of gravity when in its lowered position, and hence transportation thereof is much safer.

When the batching plant 2 has been transported to the desired location, depressions 300 (FIG. 1) are dug in the earth 4 for receiving the tires 38, said depressions 300 being sufficiently deep so that the longitudinal tubular members 28 will rest level upon the earth. Fill dirt 302 (FIG. 1) is then placed over the portions of the longitudinal tubes 28 disposed between the longitudinally spaced pairs of transversely opposed standards 16, whereby to form a roadway for driving the truck 6 under the platform 12 of the batching plant.

The platform 12 is then raised above the base 10 by suitable means, such as a crane, and the pins 20 are placed in position beneath the posts 18 for supporting the platform 12 in its elevated position. The angle iron braces 134 are then swung so that the semicylindrical collars 138 thereon engage the posts 18, and the bolts 146 are installed. The transverse braces 122 are then attached to the posts 18, and the erection of the platform 12 is then completed.

An operator then ascends to the walkway formed by the plate 100 and protected by the rails 104, and the tank 22 is filled with water from a suitable source. Emulsified asphalt is then placed in the tank 24, said asphalt normally being pumped from a tank truck which has been driven to the construction location. The screen 250 is disposed in its lowered position, resting on the upper end of the hopper 26, and the lever 222 is actuated to close the gate 208 on the hoppers 194. Aggregate of the desired grading is then placed in the two compartments of the hopper 26.

The separate compartments of the hopper 26 facilitate combining aggregates having different graduations of coarseness, and the dividing partitions 278 therein also function to structurally reinforce said hopper. The hopper 26 is preferably constructed so that when both compartments thereof are filled to the top, it will contain the precise quantity of aggregate needed for a batch of slurry. It is to be understood, however, that the hopper 26 can also be constructed to hold more than one batch of aggregate, and that it can be provided with graduations on the inner surfaces thereof to indicate the volume of material contained therein.

After the hopper 26 has been filled with material, which will normally be accomplished either by conveying the material into the hopper from a truck or by utilizing a dragline, the screen 250 is raised and the aggregate is leveled to insure correct measurement, and the batching plant is ready for operation.

A mixing truck 6 is then driven under the platform 12, so that the filling spout 8 thereof is positioned for receiving liquid from the outlet pipes 294 and 296, and aggregate from the chutes 184. After the truck 6 is in position, an operator positioned on the platform 12 manipulates the T-shaped handles 284 and 286 to dispense the correct quantities of water and emulsified asphalt from the storage tanks 22 and 24, this operation being facilitated by the sight gauges 260 and 262. After the two liquids have been placed in the truck 6, the mixing tank thereof is caused to rotate, and thereafter the lever 222 is actuated to open the gate 208.

The operator opens the gate 208 a sufficient distance to allow aggregate to flow at a desired rate into the mixing tank of the truck 6. Normally, the gate 208 will not be opened to its full extent, whereby to avoid improper mixing of the aggregate with the liquids contained in the truck. After the desired amount of material has been emptied from the hopper 26 into the truck 6, the gate 208 is again closed, and the truck 6 is driven away from the batching plant 2.

The loading of a typical mobile mixing truck from the batching plant 2 of the invention will take but a few minutes. The constituents of the slurry mixture contained within the truck are then mixed for several minutes, usually about six, after which the slurry is ready for application to the road surface; mixing of the slurry can be carried on while the truck is being driven to the construction site, as is the usual manner of operation for such trucks. It is thus seen that by utilizing the batching plant of the invention the time from combining the ingredients of a slurry mixture until application of the mixture to a road surface can be maintained at a minimum, usually less than ten minutes. This insures that adequate time will be available to properly apply the slurry to the road surface before curing thereof begins.

After a truck has been filled, the hopper 26 is again filled with aggregate, and if necessary the tanks 22 and 24 are also again filled. The batching plant 2 is then again ready for operation. Operation of the batching plant 2 is continued until the road resurfacing project is completed, or until the travel time between it and the construction site becomes too great and adversely affects the slurry mixture. At that time, the batching plant 2 is again readied for transport.

To ready the batching plant 2 for transport, the operator first descends from the platform 12, and the brace assemblies 122 and 132 are removed from the posts 18. A suitable hoisting device is again secured to the platform 12, and the pins 20 are removed, thereby permitting telescoping of the supports 14. A suitable towing vehicle is then secured to the tongue 68, and the batching plant 2 is towed to wherever desired. While the batching plant 2 of the invention has been described with reference to slurry mixtures for use in solving the problems of quality control and maintaining the time between mixing and application of a slurry mixture to a minimum, it is to be understood that other uses therefor are also possible.

Obviously, many modifications and variations of the invention are possible in the light of the above teachings. It is therefore to be understood that, within the scope of the appended claims, the invention may be practiced otherwise than as specifically described.

I claim:

1. A batching plant, comprising: a base; a platform above said base; a plurality of telescopic supports secured to said base and said platform, and arranged when extended to support said platform in an elevated position above said base; detachable means for bracing said platform in longitudinal and transverse directions when said platform is in an elevated position; storage means on said platform for separately storing liquid and aggregate for a batch; a walkway on said platform for supporting an operator; and control means on said storage means, including operating elements extending upwardly through said walkway and arranged to be operated by an operator positioned on said walkway, for separately and selectively dispensing liquid and aggregate from said storage means into a common region beneath said platform.

2. A batching plant as recited in claim 1, including additionally a pair of wheels secured to at least one end of said base, and tongue means secured to the other end of said base.

3. A batching plant as recited in claim 1, wherein said storage means comprises: a pair of spaced liquid storage tanks supported on said platform, each of said storage tanks having a conduit connected thereto, and each of said conduits being arranged to discharge liquid for a batch into said common region beneath said platform; and a hopper supported by said platform between said tanks, and including a chute arranged to discharge aggregate material into said common region beneath said platform.

4. A batching plant as recited in claim 1, wherein said base is arranged to be disposed so that a vehicle may be driven thereover, and wherein said telescopic supports are spaced apart and are arranged to be vertically extended sufficiently so that when said platform is in an elevated position and said base is disposed so that a vehicle may be driven thereover, a driveway is provided between said base and said elevated platform.

5. A batching plant as recited in claim 3, wherein additionally each of said tanks is provided with gauge means for visually indicating the quantity of liquid contained therein.

6. A batching plant as recited in claim 3, wherein said control means includes: a pair of flow control valves, one valve of said pair of valves being connected into one of said conduits and the other valve of said pair of valves being connected into the other of said conduits, each of said valves including an operating element arranged to extend upwardly through said walkway; and gate means mounted on the lower end of said chute and operable for opening and closing said chute, said gate means including an operating element arranged to extend upwardly through said walkway.

7. A batching plant, comprising: a base; a platform above said base; a plurality of telescopic supports secured to extend between said base and said platform, and arranged to support said platform in an elevated position above said base; a walkway on said platform for supporting an operator; a pair of spaced liquid storage tanks supported on said platform, each of said tanks having a conduit means connected thereto, and each conduit means being arranged to discharge liquid for a batch from its associated tank to a region below said platform; a hopper for storing aggregate, said hopper being supported by said platform between said tanks, and including chute means arranged to discharge aggregate material for a batch from said hopper to a region below said platform, said chute means and both of said conduit means being arranged to discharge into a common region below said platform; a gate pivotally mounted on and movable to open and close said chute means; operating means connected to said gate and arranged for operation by an operator positioned on said walkway, said operating means being operable from said walkway to move said gate to open and close said chute means to discharge the aggregate material for a batch; and flow control means arranged for operation by an operator positioned on said walkway to separately and selectively control the flow of liquid through each of said conduit means for effecting discharge of the quantities of liquids desired for a batch, said flow control means comprising: a pair of flow control valves mounted under said walkway, one valve of said pair of valves being connected with one of said conduit means and the other valve of said pair of valves being connected with the other of said conduit means; and an operating handle connected to each valve, said handles extending upwardly through said walkway.

8. A batching plant as recited in claim 7, wherein said telescopic supports each includes: a cylindrical standard secured to one of said base and said platform; a cylindrical post secured to the other of said base and said platform, and telescopically receivable within said cylindrical standard; and means for selectively securing said post in an extended position relative to said standard whereby to support said platform in an elevated position above said base.

9. A batching plant as recited in claim 8, including additionally: transverse bracing means detachably connected to said posts when said platform is in an elevated position, and longitudinal bracing means carried by said other of said base and said platform, and detachably connected to said posts when said platform is in said elevated position.

10. A batching plant as recited in claim 7, wherein said base is provided with ground-engaging wheels on at least one end thereof.

11. A batching plant as recited in claim 7, wherein additionally said tanks are each provided with gauge means for visually indicating the amount of liquid contained therein, said gauge means being arranged for observation by said operator.

12. A batching plant as recited in claim 7, wherein said chute means includes at least a pair of end plates terminating at the lower ends in arcuate edges, and wherein said gate comprises: an arcuate plate slidingly engageable with said lower arcuate edges of said end plates; and means for pivotally supporting said arcuate plate on said chute means.

13. A batching plant as recited in claim 7, including additionally a screen disposed to rest on the top of said hopper to extend thereover, and pivotally connected along one edge thereof to said hopper, and wherein said hopper is divided into a plurality of compartments, each having a chute associated therewith, said gate being arranged to simultaneously open and close all of said chutes.

14. In a batching plant: a base; a platform; a plurality of telescopic supports secured to said base and to said platform, and arranged when extended to support said platform in an elevated position above said base, said telescopic supports each comprising: a cylindrical standard secured to said base to extend vertically upwardly therefrom; a post secured to project vertically downwardly from said platform, said post being telescopically receivable within said standard; and means engageable with said standard for supporting said post in an extended, elevated position relative thereto; and detachable means for bracing said platform in longitudinal and transverse directions when said platform is in an elevated position, including a longitudinal brace assembly associated with each post, each said longitudinal brace assembly comprising: a pair of spaced, elongated members pivotally attached at their upper ends to a longitudinally extending portion of said platform, one of said members being disposed on each side of said post; an open-sided collar on the lower end of each elongated member; and means for detachably securing the lower ends of said elongated elements to said post with said collars in engagement with said post.

15. In a batching plant as recited in claim 14, wherein said standards and said posts are arranged in transversely opposed pairs, and wherein said detachable brace means includes a transverse brace assembly associated with each pair of transversely opposed posts, said assembly including: a plurality of rigidly connected elongated members arranged to extend diagonally between said posts; and means for detachably connecting the ends of said elongated members to said posts.

16. In a batching plant as recited in claim 14, wherein said base includes a pair of longitudinally extending, spaced members arranged to be disposed so that a vehicle may be driven thereover, said standards being secured to said longitudinally extending members and being arranged in longitudinally spaced, transversely opposed pairs, whereby when said longitudinally extending base members are disposed so that a vehicle may be driven thereover and said platform is in an elevated position a drive way is defined between each pair of transversely opposed standards.

17. In a batching plant as recited in claim 16, including additionally a pair of wheels secured to one end of said base and carried by said longitudinally extending members, and a tongue secured to the other end of said base.

References Cited by the Examiner
UNITED STATES PATENTS

| | | | |
|---|---|---|---|
| 612,780 | 10/1898 | Mansione | 182—141 X |
| 1,487,468 | 3/1924 | Palmer et al. | 222—129 |
| 2,080,977 | 5/1937 | Albrecht | 209—260 X |
| 2,138,172 | 11/1938 | Johnson | 259—149 |
| 2,290,535 | 7/1942 | Cavins | 182—179 |
| 2,299,702 | 10/1942 | Mosel | 222—129 X |
| 2,512,534 | 6/1950 | Shaw | 182—141 X |
| 2,679,335 | 5/1954 | Bell | 222—108 |
| 3,101,931 | 8/1963 | Setter | 259—154 |

OTHER REFERENCES
Engineering News, December 12, 1912, page 1085.

LOUIS J. DEMBO, *Primary Examiner.*

F. R. HANDREN, *Assistant Examiner.*